Sept. 27, 1949.  G. B. WARREN ET AL  2,483,163
SHUT-OFF VALVE
Filed May 7, 1945

Inventors:
Glenn B. Warren,
Edwin E. Parker,
by *Harry E. Dunlavy*
Their Attorney.

Patented Sept. 27, 1949

2,483,163

UNITED STATES PATENT OFFICE 2,483,163

SHUTOFF VALVE

Glenn B. Warren and Edwin E. Parker, Schenectady, N. Y., assignors to General Electric Company, a corporation of New York Application May 7, 1945, Serial No. 592,322

1 Claim. (Cl. 251—156)

This invention relates to shut-off valves for high pressure fluids, particularly stop valves for shutting off the flow of high pressure steam to a fluid pressure turbine or other consumer.

An object of the invention is to provide a valve arrangement which is simple to manufacture, and can be conveniently assembled and disassembled for service and repair.

Another object is to provide means for slidably supporting the valve actuating stem in a wall of the housing especially designed to prevent binding or sticking of the valve in service while preventing leakage from the housing around the stem.

A further object is to provide simple means for preventing fluttering of the valve disk and stem when in the open position.

Figure 1:
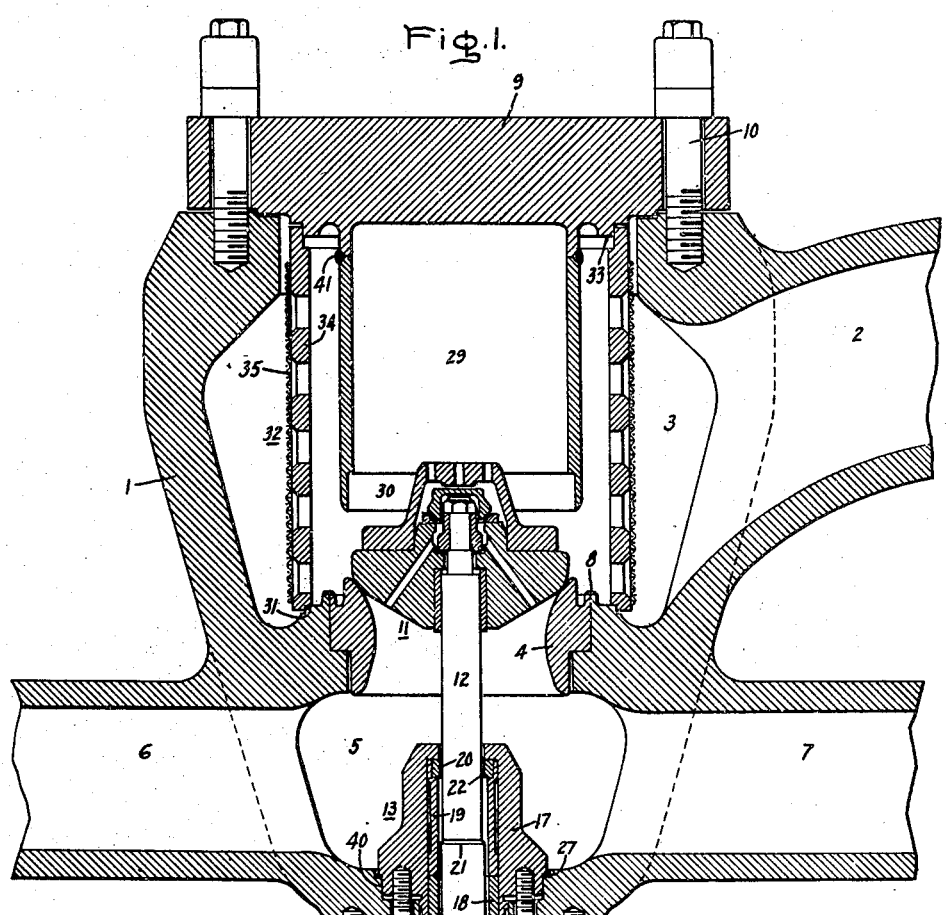
Figure 2:
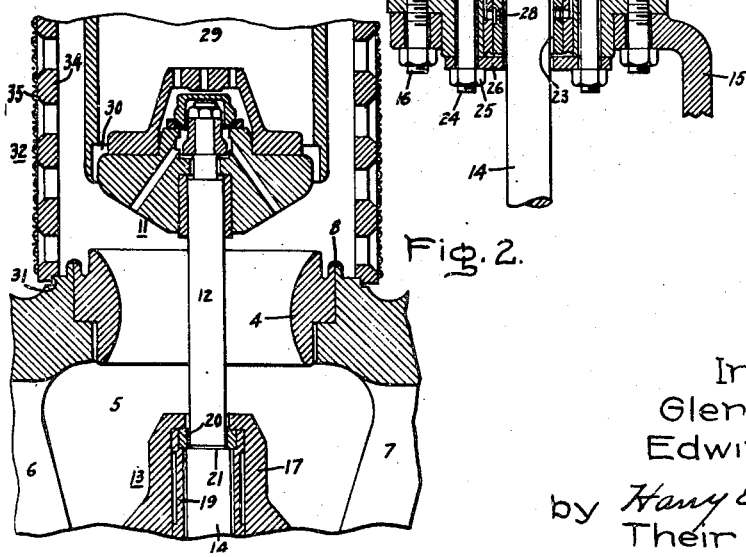

Further objects and advantages will be apparent from the following description and the appended claim taken in connection with the accompanying drawings, in which Fig. 1 is a sectional view of a shut-off valve made in accordance with the invention, and Fig. 2 is a partial view in section showing the relation of the parts when the valve is in the open position.

By reference to Fig. 1 it will be seen that the valve comprises a housing 1 provided with an inlet conduit 2 opening into an inlet chamber 3, a valve seat member 4 supported in the housing 1, and a discharge chamber 5 communicating with outlet conduits 6 and 7. The valve seat 4 is shown as a separate member secured to the housing by means of annular weld 8, the weld being arranged in a well-known manner to provide certain flexibility so that differential thermal expansion between the seat and housing will not impose excessive stresses on the weld.

To facilitate assembly and disassembly of the valve, the housing 1 is provided with a removable head 9 secured to the housing by suitable threaded fastenings 10. A valve disk assembly 11 is arranged to tightly seat on the member 4. The details of the disk assembly 11 are not important to an understanding of the present invention.

The disk assembly 11 is supported at the free end of a valve stem 12 which is slidably arranged in a support bushing assembly 13 secured to the inner wall of the discharge chamber 5 and defining an opening in the wall of the discharge chamber through which the end portion 14 of the valve stem extends. The stem portion 14 is adapted to be connected with a suitable motor (not shown) for raising and lowering the valve disk 11. A bracket 15 is secured to the housing 1 by studs 16 and serves to support the valve housing and the valve actuating motor in a desired fixed relation to each other.

The valve stem support bushing assembly 13 comprises a body member 17 having a bore in which are the sleeves 18 and 19 and the ring 20. The valve stem end portion 14 is of slightly larger diameter than the stem 12, the two portions being separated by the conical shoulder 21. The ring 20 is provided with a beveled inner corner 22 which forms a seat against which the shoulder 21 tightly abuts when the valve is in open position, as may be seen more clearly in Fig. 2. This sealing engagement between shoulder 21 and the seat 22 effectively prevents leakage from the interior of the housing around the valve stem to the exterior of the housing, when the valve is open.

While the sleeves 18 and 19 serve to guide the valve stem, it will be seen that there is an appreciable clearance space 23 between the stem and the sleeves. This clearance space has been exaggerated somewhat in the drawings, and in actual practice it may amount to about 0.010 inch diametral clearance with a valve stem approximately 2½ inches diameter.

It has been found that if the stem 14 fits the sleeves 18 and 19 tightly enough to prevent appreciable leakage therebetween, then in service certain mineral matter, for instance that resulting from the decomposition of boiler compounds, are deposited in the clearance space. If the valve should remain in open position during a long period of operation, these salts deposited in the clearance space 23 may build up sufficiently to cause sticking or complete freezing of the stem in the support bushing. It will be obvious that extremely serious consequences would follow if the emergency overspeed governor of a steam turbine acted to trip the shut-off valve to closed position, but the closing movement of the valve was retarded or prevented entirely by the mineral deposits in the clearance space 23.

In the present construction the clearance 23 between the stem and various components of bushing assembly 13 is made as large as experience dictates is necessary to prevent sticking or freezing due to the solids deposited in the clearance space. This clearance is sufficiently large that the fluid leakage around the stem when the valve is in open position would be much more than is permissible. The engagement of the shoulder 21 with the beveled seat 22 of ring 20 when the valve disk is in open position provides positive sealing action to eliminate leakage around the valve stem and thus prevent solids being carried into the clearance space.

The body 17 of the bushing assembly 13 is held in position in a recess 40 in the housing by means of studs 24 and nuts 25, which also serve to secure cover plate 26. A gasket 27 may be provided in the recess 40 to prevent fluid leakage between the body 17 and the housing 1. When the valve disk 11 is seated on member 4, there will of course be no fluid in the discharge chamber 5 to leak around the valve stem. When the disk 11 is in open position it will be seen that leakage from the discharge chamber is prevented by the gasket 27 and the sealing engagement between shoulder 21 and the beveled seat 22. If there should be some leakage around the stem and bushing, as for example when the valve is moving or when dirt on seat 22 prevents tight seating of shoulder 21, such leakage fluid may be bled off through holes 28 in the sleeve 18 and corresponding holes in bushing 17, thence through suitable leak-off ports (not shown) to some region in the system which is maintained during operation at a suitable low pressure. It should be particularly noted that when the valve is in open position the pressure of the steam in the discharge chamber 5 will tend to force the bushing body 17 into tight sealing engagement with the gasket 27.

As noted above, the appreciable clearance space 23 is required in order to prevent sticking or freezing of the valve stem. Besides the above-discussed fluid leakage around the valve stem, the introduction of this large clearance produces another serious consequence. It will be noted that the valve stem is supported only by the bushing assembly 13, and that when in the open position represented in Fig. 2, the disk 11 is at an appreciable distance from the support bushing 13. This factor in combination with the large clearance space 23 introduces a tendency for the valve and stem to vibrate transversely or "flutter" when in open position. This fluttering can be so deleterious as to appreciably shorten the life of the valve. It has been found that this tendency of the valve to flutter can be eliminated by providing a suitable shield closely surrounding the valve disk when in the open position so that the rapidly flowing fluid is prevented from impinging on the disk and imparting to it dynamic forces which would cause the fluttering.

This shield is provided in the form of a hollow cylinder 29 secured by weld 41 to the removable head member 9, extending toward the disk assembly 11 and having the end 30 shaped to closely surround the disk assembly 11 in the open position, but without touching it, as shown in Fig. 2. It will be noted that with the valve in the open position, the outer surface of the shield 29 and the under surface of the disk 11 form a substantially continuous surface over which the flowing fluid can pass with a minimum of disturbance to the fluid flow, and with a minimum of dynamic forces caused by the fluid impinging on the disk. Thus, the arrangement of the shield 29 is intended to both provide a more efficient flow path for the fluid through the valve and at the same time eliminate the tendency of the valve disk to flutter transversely.

Seated on a shoulder 31 surrounding the valve seat 4 is a steam strainer 32 supported at its other end by engagement with a shoulder 33 on the head member 9. The strainer is represented as comprising a perforated support cylinder 34 carrying a mesh screen 35, but it will be obvious that suitable strainers of many other types may also be used. The annular space between shield 29 and strainer 32 must of course be properly proportioned to permit unrestricted flow of the steam through the strainer to the valve opening in the seat member 4.

The various components of this valve assembly are proportioned so as to facilitate assembly and disassembly of the valve. By removing the head member 9, the strainer 32 can be readily removed for repair, cleaning, or replacement, without disturbing any other parts of the assembly. Likewise, the disk and stem assembly is readily removable for repair or renewal. With the operating motor disconnected from stem 14 and nuts 25 removed from studs 24, the complete disk, stem and bushing assembly can be removed upwardly from the housing, the outer diameter of the bushing member 17 being made slightly less in diameter than the valve seat opening for this purpose. The valve disc and bushing assemblies are then readily accessible for servicing.

The method of assembling the valve will be obvious from the above description of the method of disassembly.

It will be seen that the invention provides a shut-off valve assembly which is convenient to assemble and disassemble, in which the possibility of the valve stem sticking is eliminated while leakage of fluid around the stem and fluttering of the valve disk when in open position is prevented.

What we claim as new and desire to secure by Letters Patent of the United States, is:

A shut-off valve for high pressure fluids comprising a housing defining a head opening and having an inlet chamber and an outlet chamber and a removable head member to close the head opening, a valve seat formed in the housing and defining a valve opening between the inlet and outlet chambers, a valve disk in the inlet chamber arranged to sealingly engage the seat and supported only by a valve stem slidably arranged in a bushing removably associated with an opening through a wall of the discharge chamber, gasket means arranged between said bushing and housing, and means securing the bushing to the housing against the gasket and in sealing engagement therewith, said means including a member secured to the bushing and extending through an opening in the housing in freely slidable relation therewith whereby fluid pressure in the outlet chamber is effective to force the bushing into tighter sealing engagement with the gasket as the fluid pressure increases, the removable head, valve disk, valve seat, and valve support bushing being proportioned so that with the head member removed the valve disk, stem, and bushing may be removed as a unit through the head opening.

GLENN B. WARREN.
EDWIN E. PARKER.

REFERENCES CITED

The following references are of record in the file of this patent:

UNITED STATES PATENTS

| Number | Name | Date |
| --- | --- | --- |
| 1,485,541 | Waycott | Mar. 4, 1924 |
| 1,799,025 | Schrader | Mar. 31, 1931 |
| 1,883,843 | Woodford | Oct. 18, 1932 |
| 2,333,455 | Warren | Nov. 2, 1943 |

FOREIGN PATENTS

| Number | Country | Date |
| --- | --- | --- |
| 423,144 | Great Britain | 1934 |